United States Patent [19]
Walling

[11] Patent Number: 5,660,720
[45] Date of Patent: Aug. 26, 1997

[54] CONNECTOR SYSTEM FOR USE WITH REVERSE OSMOSIS WATER PURIFIER

[76] Inventor: David F. Walling, 4006 W. Rancho Dr., Phoenix, Ariz. 85019

[21] Appl. No.: 594,875

[22] Filed: Jan. 31, 1996

[51] Int. Cl.6 .................................................. B01D 17/12
[52] U.S. Cl. ........................ 210/85; 137/594; 137/798; 210/96.2; 210/232; 210/541
[58] Field of Search ........................... 210/85, 93, 96.2, 210/232, 257.2, 258, 541, 542, 96.1; 285/137.1, 18, 120, 130; 137/594, 597, 798

[56] References Cited

U.S. PATENT DOCUMENTS

| | | | |
|---|---|---|---|
| 566,296 | 8/1896 | Conderman | 285/137.1 |
| 2,447,185 | 8/1948 | Keim | 285/137.1 |
| 2,498,219 | 2/1950 | O'Brzen | 137/798 |
| 3,004,777 | 10/1961 | Buonaccorsi | 285/137.1 |
| 3,550,782 | 12/1970 | Veloz | 210/192 |
| 3,620,241 | 11/1971 | Brown | 137/594 |
| 4,032,821 | 6/1977 | Keiser | 285/137.1 |
| 4,599,171 | 7/1986 | Padilla et al. | 210/257.2 |
| 4,759,844 | 7/1988 | Lipshultz et al. | 210/257.2 |
| 4,885,085 | 12/1989 | Beall, Jr. | 210/137 |
| 5,045,197 | 9/1991 | Burrows | 210/321.78 |
| 5,092,994 | 3/1992 | Kohn et al. | 210/227 |
| 5,096,574 | 3/1992 | Birdsong et al. | 210/96.2 |
| 5,122,265 | 6/1992 | Mora et al. | 210/134 |
| 5,133,858 | 7/1992 | Walz et al. | 210/136 |
| 5,147,533 | 9/1992 | Lipshultz et al. | 210/98 |
| 5,194,156 | 3/1993 | Tomchak | 210/541 |
| 5,290,442 | 3/1994 | Clack | 210/257.2 |
| 5,435,909 | 7/1995 | Burrows | 210/85 |

*Primary Examiner*—Joseph W. Drodge
*Attorney, Agent, or Firm*—Frank J. McGue

[57] ABSTRACT

A connector system is disclosed for use in connection with a reverse osmosis water purification system. The reverse osmosis water purification system has an inlet line, a drain line, an outlet line, and a storage tank mounted on the outlet line providing a reservoir of purified water. The storage tank is pressurized to force the purified water from the reservoir through the outlet line. The connector system comprises an inlet fitting connecting an incoming water line to an inlet on the reverse osmosis water purification system, an on/off inlet valve mounted to the inlet fitting, a spigot fitting connecting the outlet line to a spigot, a drain fitting connecting the drain line to a drain, a tank fitting having an on/off valve connecting the tank to the outlet line, a fitting for releasing the pressure, and an accessory fitting connecting the outlet line to an accessory. The connector system further includes a monitor checking the quality of the water moving through the connector system. The connector system mounts all of the fittings and the monitor to a convenient surface.

10 Claims, 2 Drawing Sheets

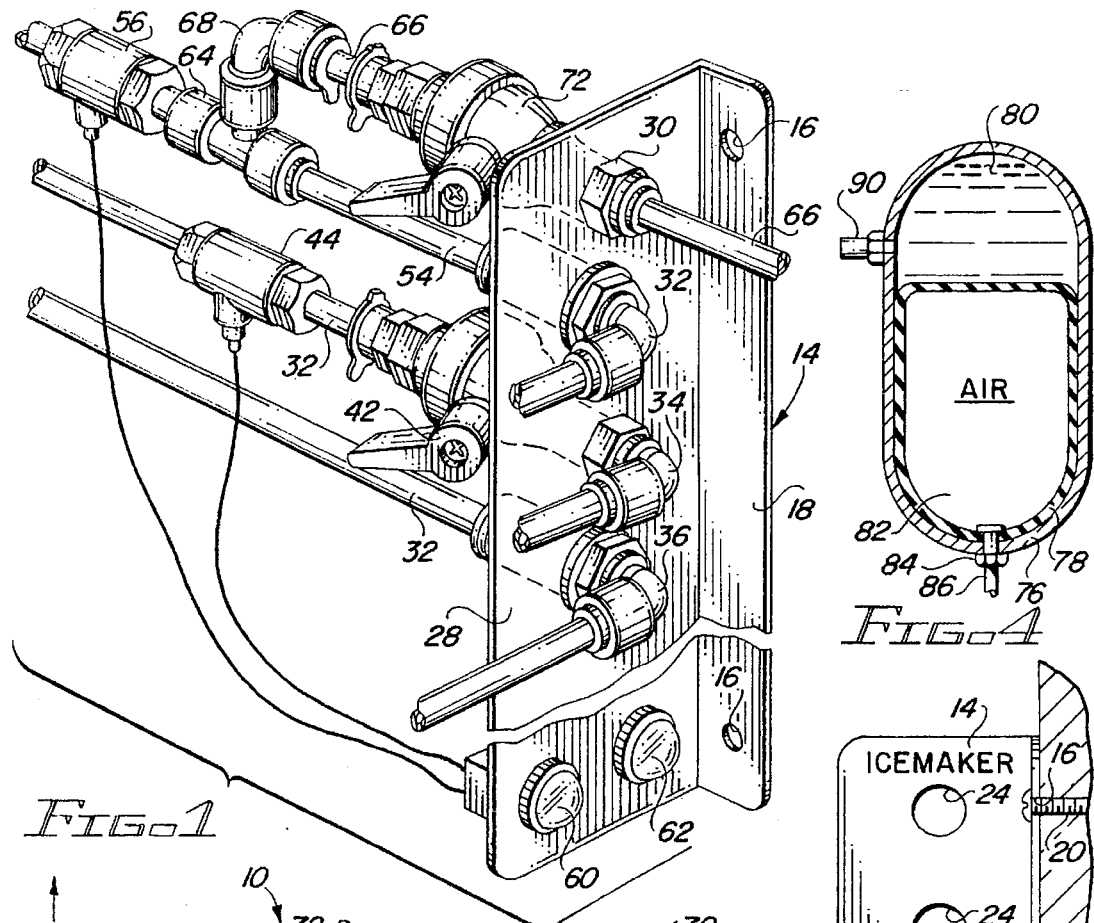
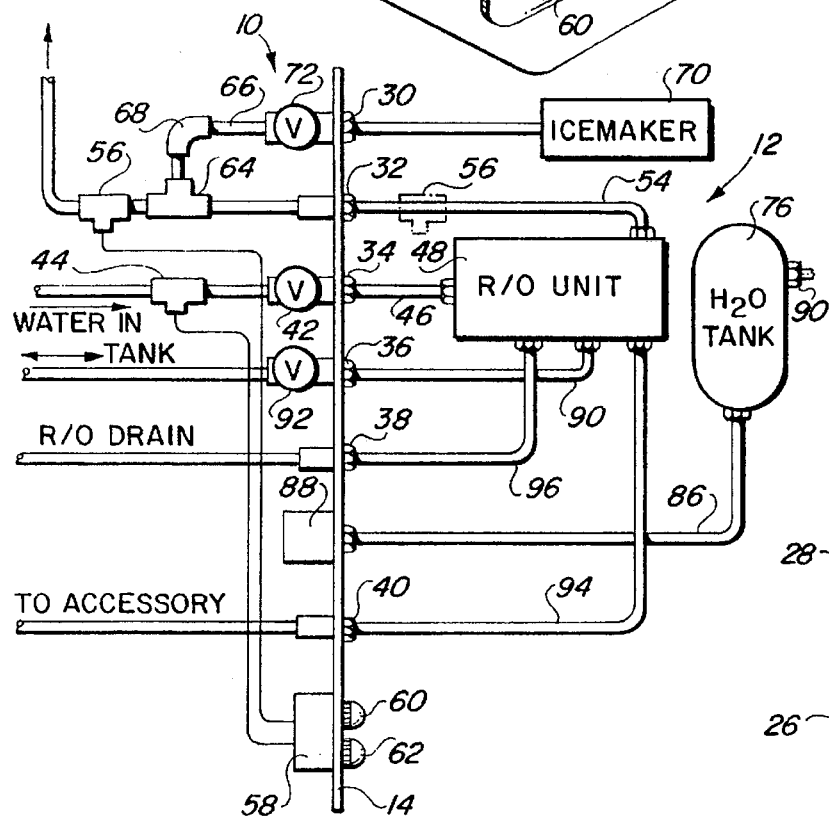
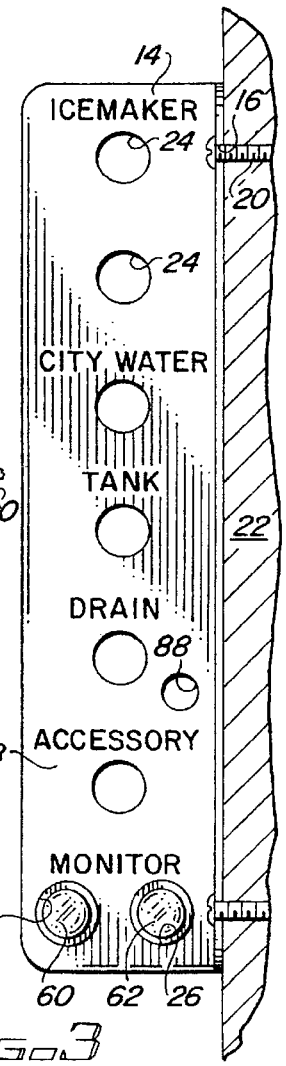

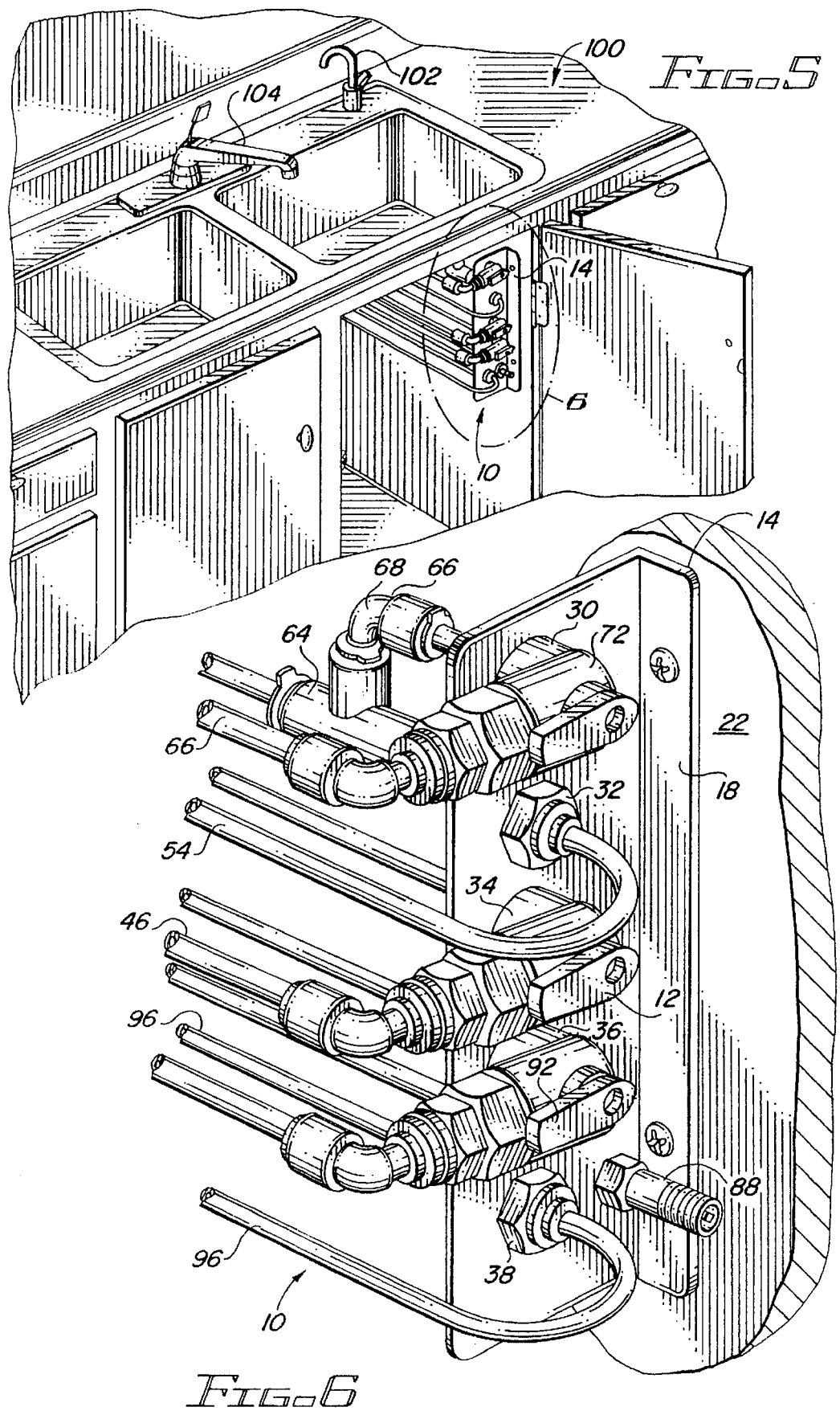

CONNECTOR SYSTEM FOR USE WITH REVERSE OSMOSIS WATER PURIFIER

TECHNICAL FIELD

This invention relates to a connector system for use in connection with reverse osmosis water purifiers, and, more particularly, to a system which simplifies access, removal and service of such reverse osmosis water purifiers.

BACKGROUND OF THE INVENTION

Reverse osmosis water purifiers are generally well-known in the art for producing a purified water supply used for drinking, cooking, etc. Such purifiers commonly include a reverse osmosis unit having a reverse osmosis membrane which, in the presence of appropriate flow and pressure conditions, separates an incoming tap or feed water supply into the purified water supply and a relatively impure or reject water supply. In particular, the membrane acts to remove particulate matter and a wide range of dissolved solids and other contaminants from a portion of the tap water to produce the purified water supply, and to concentrate those contaminants within the remainder of the tap water thereby producing the reject water supply for disposal via a suitable drain.

The purified water is normally collected for storage at a convenient location within a suitable accumulator tank or reservoir, and for ready dispensing through a spigot of the like when desired. In this regard, suitable tanks have generally used either compressed air or the pressure of the tap water supply to deliver purified water from the tank. Various reverse osmosis apparatuses have been described in the literature.

U.S. Pat. No. 5,122,265 entitled "Compact Reverse Osmosis System with Cold Water Flush" which issued Jun. 16, 1992 to Mora et al. discloses a reverse osmosis system in which there is a manifold having water supplied through a line, an elbow and a union connector. Pure water leaves the R/O unit through an exit and a second line. Waste is removed through another exit and a drain line.

U.S. Pat. No. 4,885,085 entitled "Direct Acting Reverse Osmosis Water Purifier Valves" which issued Dec. 5, 1989 to Beall, Jr. provides a reverse osmosis water purification system having a valve which has a water inlet, a purified water outlet, a drain line and several other connections.

U.S. Pat. No. 5,045,197 entitled "Reverse Osmosis Purification System with Unitary Header Manifold" which issued Sep. 3, 1991 to Burrows shows a reverse osmosis purification system having a manifold which has a water supply inlet fitting, a drain fitting and two pure water fittings.

U.S. Pat. No. 5,133,858 entitled "Reverse Osmosis Water Purification Apparatus" which issued Jul. 28, 1992 to Walz et al. discloses a reverse osmosis water purification apparatus having a mounting bracket and a R/O unit.

Reverse osmosis water purifiers are generally positioned in cabinet space underneath sinks and the like. Connections are made between the reverse osmosis water purifier to the tap water input line, a spigot, the drain, ice maker and the like. The plethora of connections has generally required a plumber experienced in reverse osmosis systems to handle any service, filter changes and the like since locating even a simple item such as the incoming water on/off valve can be a daunting prospect for the average homeowner. Thus, there is a need for a connector system which allows easy and quick servicing of reverse osmosis water purifiers.

None of the known prior art disclose the device set forth herein.

SUMMARY OF THE INVENTION

It is an object of this invention to provide a connector system for quickly disconnecting and removing a reverse osmosis water purifier thereby allowing easy access thereto.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of one embodiment of the present invention;

FIG. 2 is schematic of one embodiment of the present invention used in conjunction with a reverse osmosis water purifier;

FIG. 3 is a front view of one embodiment of the present invention mounted to a surface;

FIG. 4 is a rear cross sectional view of an accumulator tank used in a reverse osmosis water purifier;

FIG. 5 is a perspective view of another embodiment of the present invention mounted under a sink; and FIG. 6 is a close up perspective view of the circled area 6 of FIG. 5.

DESCRIPTION OF THE PREFERRED EMBODIMENT

Referring more particularly to the drawings by characters of reference, FIGS. 1–6 disclose a connector system 10 for use in connection with a reverse osmosis water purifier system 12. In the embodiment best seen in FIGS. 1 and 3, system 10 includes an L-shaped mounting plate 14 having two mounting holes 16 drilled through a first leg 18 of plate 14. Screws 20 extend through holes 16 and into a substrate 22 to secure system 10 thereto. Of course, those skilled in the art will recognize that many other methods of securing system 10 to substrate 22 are possible. The key to the invention is mounting the connector system to a single location in an easily accessible area as, for example, seen in FIG. 5.

As best seen in FIG. 3, in the presently preferred embodiment, plate 14 includes piping holes 24 and monitor holes 26 extending through the second leg 28. Plumbing fittings 30, 32, 34, 36, 38 and 40 are mounted to holes 26 which in turn secure piping thereto. Preferably, fittings 30, 32, 34, 36, 38 and 40 allow quick disconnecting and reconnecting such fittings from the piping being available from companies such as John Guest USA Inc. of Totowa, N.J. or The Specialty Mfg. Co. of St. Paul, Minn., as well as other suppliers. Such fittings are well-known in the art and will not be further described herein.

In the embodiment illustrated in FIGS. 1 and 2, tap water enters system 10 at inlet fitting 34. An on/off inlet valve 42 is mounted upstream from inlet fitting 34. Inlet valve 42 provides an easily accessible point to shut off water to the entire system for service and the like. Optionally, a first water quality sensor 44 is mounted upstream from inlet valve 42.

Tap water enters system 10 via inlet valve 42 and inlet fitting 34 and is directed via piping 46 to the reverse osmosis water purifier system 12 which includes a reverse osmosis, or R/O, unit 48. As described previously, R/O unit 48 has a reverse osmosis membrane (not shown) which, in the presence of appropriate flow and pressure conditions, separates the incoming tap water supply into a purified water supply and a relatively impure or reject water supply. The purified water supply exits R/O unit 48 via pipes 54, a tank 76, or a pipe 90 as described in detail below.

The purified water is directed from R/O unit 48 through pipe 54 to spigot fitting 32 and hence to a purified water spigot 102 (best seen in FIG. 5) on the sink 100. Optionally, a second water quality sensor 56 is mounted along pipe 54 either between a T-connector 64 and spigot 102 or, as shown in shadow in FIG. 2, between R/O unit 48 and spigot fitting 32.

Water quality sensors 44 and 56 are in electrical communication with a water quality monitor 58 which, in turn, is in electrical communication with a red light 60 and a green light 62. Green light 62 indicates good water quality while red light 60 indicates that R/O system 12 may require service such as a filter change. Of course, other methods of indicating water quality such as gauges and the like could also be employed as those skilled in the art will recognize.

If desired, T-connector 64 is mounted onto pipe 54 between the spigot and spigot fitting 32. T-connector 64 directs purified water from pipe 54 into pipe 66. Pipe 66 includes an elbow 68 which directs pipe 66 back to icemaker fitting 30 on system 10. From icemaker fitting 30, pipe 66 conveys purified water to an icemaker 70. To allow service on icemaker 70 without shutting down R/O unit 48, an on/off icemaker valve 72 is preferably mounted between elbow 68 and icemaker fitting 30.

In most R/O systems 12, but not all, purified water is directed via pipe 90 to tank 76. As best seen in FIG. 4, tank 76 is divided by expandable bladder 78 into a reservoir 80 and a pressurizing volume 82. The purpose of tank 76 is to provide an immediate supply of purified water when an outlet such as spigot 102 is opened or an accessory calls for water. In addition, tank 76 accumulates water flowing through R/O unit 48 during periods when there is no usage of water.

As shown in FIGS. 2 and 4, water is directed from pipe 90 into reservoir 80. Water will continue to enter reservoir 80 until the pressure in pressurizing volume 82 is equal to the permeate water outlet pressure as measured in line 90 which is approximately equal to 75% of the tap water inlet pressure due to the pressure drop caused by the reverse osmosis membrane. Upon the opening of the spigot or other accessory, water will be forced out of reservoir 80 by the pressurizing volume 82, through pipe 74 to connector 52 where it is conveyed to the open spigot or to satisfy other demands. As is well-known in the art, reservoir 80 is made large enough to accumulate the water flowing through R/O unit 48 during periods of no use.

Pressurizing volume 82 will contain either air as illustrated in FIGS. 2 or 4 or, alternatively, be connected to the reject water from the R/O unit via a direct acting or squeeze valve. As described previously, water entering reservoir 80 will compress the air in volume 82 until the air pressure equals the permeate water outlet pressure. Once spigot 102 or the like is opened, the air in volume 82 will begin to expand and force the water from reservoir 80. To allow service, pressurizing volume 82 is connected via a pressure fitting 84 to pipe 86 and hence to an air check valve 88, preferably a Schrader valve, mounted on plate 14. Valve 88 allows release of the compressed air from volume 82 or addition of air to volume 82 as desired. Valves 88 are well-known in the art.

To permit service of tank 76, pipe 90 conveys water from R/O unit 48 to tank fitting 36. A normally open valve 92 mounted proximate to tank fitting 36 allows service of tank 76 without disconnecting the entire R/O unit 48. Once valve 92 is shut, tank 76 is isolated from R/O unit 48. In addition, the use of a quick disconnect fitting 36 allows the pipe 90 to be disconnected at fitting 36 for draining, flushing and refilling of tank 76 as needed. Further, opening valve 88 releases the pressure in volume 82. Once service is complete, volume 82 is recharged from valve 88 using, for example, a hand pump or an air compressor (not shown).

In an alternate embodiment (not shown), pressurizing volume 82 is connected via pressure fitting 84 and pipe 86 directly to the reject water from the R/O unit 48. In this embodiment, a squeeze valve, such as a Beall valve described in U.S. Pat. No. 4,885,085 entitled "Direct Acting Reverse Osmosis Water Purifier Valves" which issued Dec. 5, 1989 to Beall, Jr. The Beall, Jr. valve opens in response to opening of a pilot valve and controls the flow of pressurized waste from R/O unit 48 to volume 80. The pressurized reject water is used to pressurize the pure water to provided adequate water delivery pressure when spigot 102 is opened. This embodiment has some advantages in that neither Schrader valve 88 nor tank fitting 26 are needed since turning off valve 42 eliminates the pressure in bladder 78.

Optionally, a pipe 94 conveys purified water from R/O unit 48 to accessory fitting 40 and hence to any desired accessory such as a cold water dispenser, a hot water dispenser, a remote ice maker and the like (not shown).

Lastly, pipe 96 conveys the reject water from R/O unit 48 to drain fitting 38. Pipe 96 continues beyond drain fitting 38 to the air gap located on spigot 102 mounted to sink 100 and hence to the sewer system.

To use, system 10 is attached to a suitable substrate 22 such as the interior side of a cabinet via screws 20 or other attachment means as best illustrated in FIG. 6. As seen in FIG. 2, all of the fittings 30, 32, 34, 36, 38 and 40, valve 88 and monitor 58 with indicator lights 60, 62 mounted on plate 14. FIG. 6 shows an alternate embodiment having only fittings 30, 32, 34, 36 and 40 as well as valve 88 mounted to plate 14.

Water purifier 12 is physically mounted in the cabinet as per the manufacturer's instructions. However, instead direct connections to spigot 102, city water and the like, the connections are instead made at the appropriate fittings on plate 14. It is preferable that the fittings be the quick disconnect type for easier removal and installation. However, the fittings can be other types since the thrust of the invention is to locate all the connections in one easily accessible location.

To service the entire unit, valve 42 is closed thereby shutting off the tap water to R/O unit 48. The use of valve 42 allows water to be disconnected to R/O unit 48 without shutting off water to faucet 104 thereby allowing users to obtain water, albeit unpurified, during servicing. Fittings 32, 34, 36 38 and 40 are disconnected as needed to drain all water from the system. If tank 76 is full, it is drained via spigot 102. R/O unit 48 is serviced or replaced, fittings 32, 34, 36, 38 and 40 reconnected and valve 42 opened and system 12 is back in operation. The use of device 10 places all of the valves, fittings and the like in an easily accessible location.

Although only certain embodiments have been illustrated and described, it will be apparent to those skilled in the art that various changes and modifications may be made therein without departing from the spirit of the invention or from the scope of the appended claims.

What is claimed is:

1. A connector system for use in connection with a reverse osmosis water purification system, the reverse osmosis water purification system having an inlet line, a drain line and an outlet line, the connector system comprising:

an inlet fitting connecting an incoming water line to the inlet line of the reverse osmosis water purification system, an on/off inlet valve mounted upstream and proximate to the inlet fitting, a spigot fitting connecting the outlet line to a spigot, a drain fitting connecting the drain line to a drain;

an icemaker fitting connecting the outlet line to an icemaker, the icemaker fitting being mounted between the spigot fitting and the spigot, an on/off icemaker valve mounted to the icemaker fitting, and an L-shaped mounting plate, the L-shaped mounting plate having at least two mounting holes in a first leg of the plate for accommodating screws extending through the at least two mounting holes into a surface thereby securing the plate to the surface, a second leg of the mounting plate having at least four holes extending therethrough, the inlet fitting, the spigot fitting, the drain fitting and icemaker fitting being mounted to and extending through the at least four piping holes.

2. The connector system of claim 1 further comprising at least two additional piping holes extending through the second leg.

3. The connector system of claim 2 wherein the inlet, spigot and drain fittings are all quick disconnect fittings.

4. The connector system of claim 2 further comprising means for monitoring the quality of the water moving therethrough.

5. The connector system of claim 4 wherein the means for monitoring comprises water quality sensors mounted in the inlet line and the outlet line, the sensors being in electrical communication with a water quality monitor, the monitor having means for indicating the quality of the water.

6. The connector system of claim 2 further comprising an accessory fitting connecting the outlet line to an accessory and means for mounting the accessory fitting to the surface.

7. The connector system of claim 1 wherein the reverse osmosis purification system further includes a pressurized storage tank mounted on the outlet line, the storage tank providing a reservoir of purified water, the connector system further comprising a tank fitting connecting the tank to the outlet line and means for mounting the tank fitting to the surface.

8. The connector system of claim 7 further comprising an additional fitting for releasing the pressure within the storage tank and means for mounting the additional fitting to the surface.

9. A connector system for use in connection with a reverse osmosis water purification system, the reverse osmosis water purification system having an inlet line, a drain line and an outlet line, the reverse osmosis water purification system further including a pressurized storage tank mounted on the outlet line, the storage tank providing a reservoir of purified water, the connector system comprising:

an inlet fitting connecting an incoming water line to an inlet of the reverse osmosis water purification system, an on/off inlet valve mounted to the inlet fitting, a spigot fitting connecting an outlet line to a spigot, a drain fitting connecting the drain line to a drain, a tank fitting connecting the tank to an outlet line, a release fitting for releasing the pressure within the storage tank, an accessory fitting connecting an outlet line to an accessory, means for monitoring the quality of the water moving through the connector system, and means for mounting the inlet fitting, the spigot fitting, the tank fitting, the release fitting, the accessory fitting, the drain fitting and the monitoring means to a surface.

10. The connector system of claim 9 wherein the means for mounting comprises an L-shaped mounting plate having at least two mounting holes in a first leg of the plate for accommodating screws extending through the at least two mounting holes into the surface thereby securing the plate to the surface, the second leg of the plate having six piping holes extending therethrough, each of the fittings being mounted to and extending through one of the piping holes.

* * * * *